(12) United States Patent
Escalante et al.

(10) Patent No.: US 11,419,311 B2
(45) Date of Patent: Aug. 23, 2022

(54) PET WASHING TABLE

(71) Applicants: Johnny Escalante, Auburn, CA (US); Lisa Sommer, Auburn, CA (US)

(72) Inventors: Johnny Escalante, Auburn, CA (US); Lisa Sommer, Auburn, CA (US)

(*) Notice: Subject to any disclaimer, the term of this patent is extended or adjusted under 35 U.S.C. 154(b) by 346 days.

(21) Appl. No.: 16/504,497

(22) Filed: Jul. 8, 2019

(65) Prior Publication Data
US 2020/0015453 A1 Jan. 16, 2020

Related U.S. Application Data

(60) Provisional application No. 62/697,510, filed on Jul. 13, 2018.

(51) Int. Cl.
| A01K 13/00 | (2006.01) |
| A01K 15/04 | (2006.01) |
| A47B 9/20 | (2006.01) |
| A47B 37/00 | (2006.01) |
| A47B 9/14 | (2006.01) |
| A47B 3/08 | (2006.01) |

(52) U.S. Cl.
CPC .......... A01K 13/001 (2013.01); A01K 15/04 (2013.01); A47B 3/08 (2013.01); A47B 9/14 (2013.01); A47B 9/20 (2013.01); A47B 37/00 (2013.01)

(58) Field of Classification Search
CPC ........ A01K 13/001; A01K 15/04; A47B 3/08; A47B 9/14; A47B 9/20; A47B 37/00
See application file for complete search history.

(56) References Cited

U.S. PATENT DOCUMENTS

| 3,266,464 A * | 8/1966 | Davis ..................... A01K 13/00 119/756 |
| 5,662,069 A * | 9/1997 | Smith .................. A01K 13/001 119/665 |
| 5,845,604 A | 12/1998 | Cucchi et al. |
| 6,516,753 B1 * | 2/2003 | Taylor .................... A01K 13/00 119/600 |
| 6,553,943 B1 | 4/2003 | Murphy |
| 7,219,625 B2 * | 5/2007 | Powers ................ A01K 13/001 119/651 |
| 7,836,854 B1 | 11/2010 | Hawkins |
| 8,069,821 B1 * | 12/2011 | Green .................. A01K 13/001 119/671 |
| 8,371,248 B2 * | 2/2013 | Redick ................ A01K 13/001 119/671 |
| 10,701,903 B1 * | 7/2020 | Cesta ........................ G08B 7/06 |
| 2005/0132979 A1 * | 6/2005 | Powers ................ A01K 13/001 119/753 |

(Continued)

*Primary Examiner* — Daniel J Rohrhoff
(74) *Attorney, Agent, or Firm* — Boudwin Intellectual Property; Daniel Boudwin

(57) ABSTRACT

A portable pet washing table. The table includes a plurality of drain holes configured to allow water and particulates to drain. Legs are attached to an underside of the tabletop, such that the legs are in a vertical position relative to the tabletop. High friction footpads are attached to each of the legs. A restraint arm is attached to the table so that the arm extends upwardly above the tabletop. A restraint is attached to the end of the restraint arm on the opposite end than that which is attached to the table, wherein the restraint is configured to secure an animal to the restraint arm. The restraint is a self-tightening noose configuration.

15 Claims, 4 Drawing Sheets

(56) References Cited

U.S. PATENT DOCUMENTS

| | | | |
|---|---|---|---|
| 2007/0295285 A1 | 12/2007 | Smith et al. | |
| 2009/0126650 A1* | 5/2009 | Walker-Indyke | A01K 13/001 |
| | | | 119/601 |
| 2012/0048153 A1* | 3/2012 | Macarthur-Onslow | ................... |
| | | | A47B 91/16 |
| | | | 108/50.11 |
| 2013/0213318 A1* | 8/2013 | Katz | A01K 15/00 |
| | | | 119/754 |
| 2014/0020107 A1* | 1/2014 | Dodgson | G06F 21/105 |
| | | | 726/26 |
| 2016/0066541 A1* | 3/2016 | Storum | A01K 15/04 |
| | | | 119/756 |
| 2016/0338321 A1* | 11/2016 | Simons | A01K 15/04 |
| 2017/0118954 A1* | 5/2017 | Hickman | A01K 13/001 |
| 2018/0132451 A1* | 5/2018 | Arndt | A01K 15/04 |

\* cited by examiner

PET WASHING TABLE

CROSS REFERENCE TO RELATED APPLICATIONS

This application claims the benefit of U.S. Provisional Application No. 62/697,510 filed on Jul. 13, 2018. The above identified patent application is herein incorporated by reference in its entirety to provide continuity of disclosure.

BACKGROUND OF THE INVENTION

The present invention relates to a pet washing table. More particularly, the present invention provides a table that is easily movable, easily positioned, and further includes a pet restraint system.

Grooming animals can be difficult for pet owners and even professional pet groomers. Some animals may be difficult to wash due to their size. Other animals may be fidgety and difficult to control. Dogs especially are much faster and smarter than their human counterparts once lathered in soap and dripping wet. Lifting larger animals onto an elevated platform can be difficult for people, especially those with physical limitations. Further, many traditional platforms for supporting animals for grooming are often very large and difficult to carry, such that grooming in a desired location may be difficult. Accordingly, a device that is configured to enable a user to easily groom a pet thereon and fold the device for storage or deployment in a desired location is desired.

Consequently, there is a need for an improvement in the art of pet washing devices. The present invention substantially diverges in design elements from the known art while at the same time solves a problem many pet groomers face. In this regard the present invention substantially fulfills these needs.

SUMMARY OF THE INVENTION

In view of the foregoing disadvantages inherent in the known types of pet washing devices now present in the prior art, the present invention provides a portable pet washing station complete with a pet restrain system wherein the same can be utilized for providing convenience for the user when washing their pets. The present system comprises a portable pet washing table. The table includes a plurality of drain holes configured to allow water and particulates to drain. Legs are attached to an underside of the tabletop, such that the legs are in a vertical position relative to the tabletop. High friction footpads are attached to each of the legs. A restraint arm is attached to the table so that the arm extends upwardly above the tabletop. A restraint is attached to the end of the restraint arm on the opposite end than that which is attached to the table, wherein the restraint is configured to secure an animal to the restraint arm. The restraint can be in a self-tightening noose configuration.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
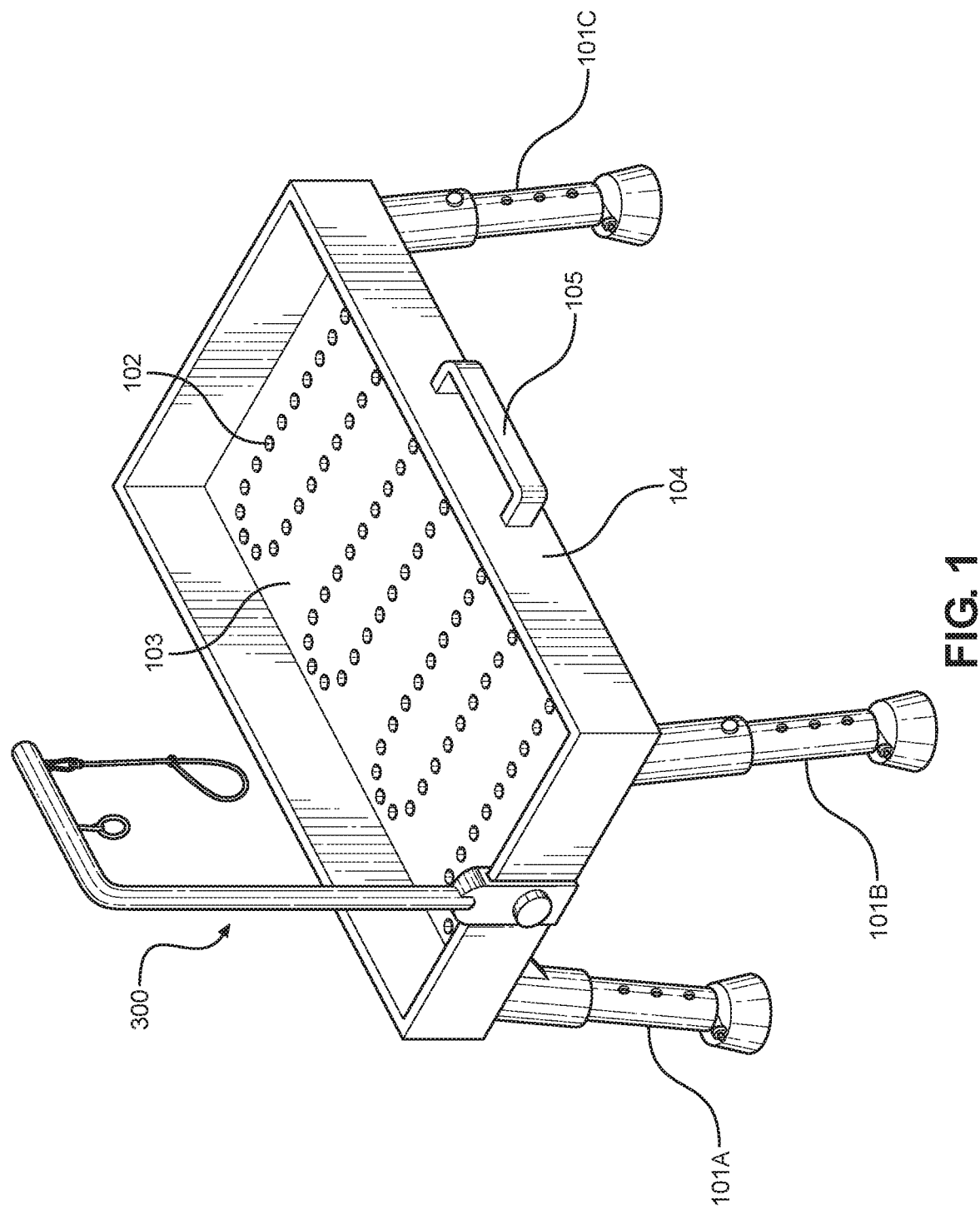
FIG. 1 shows a prospective side view of an embodiment of the dog washing table.

Reference is made herein to the attached drawings. Like reference numerals are used throughout the drawings to depict like or similar elements of the pet washing table. For the purposes of presenting a brief and clear description of the present invention, a preferred embodiment will be discussed as used for the pet washing table. The figures are intended for representative purposes only and should not be considered to be limiting in any respect.

Referring now to FIG. 1, there is shown an embodiment of a completely assembled pet washing table 100. In the illustrated embodiment, the dog washing table has 3 legs visible 101a, 101b, and 101c, however it is contemplated that various numbers of legs can be used and still maintain the tables functionality. The table can also have drainage holes 102 located in the tabletop 103. These holes may be configured to allow water, soap, and other particulates through, including but not limited to dirt and dog hair. In this embodiment it is shown that the drainage holes 102 are in a snake like pattern, however, it should be understood that any configuration of drainage holes is still within the scope of this disclosure.

In one embodiment, a raised wall 104 may be placed around the perimeter of tabletop 103 for containing water and preventing spills or splashing. The wall may be between 3 and 5 inches tall, however other heights may be appropriate depending on the intended size of the dog. The height of the wall is to prevent splashing and to help the dog keep its paws from sliding off the table.

In one embodiment, a carry handle 105 may be placed on the raised wall 104. The carry handle may be but is not limited to, rope, a solid handle or a mixture of the two. In some embodiments there are also hooks placed on the raised wall 104. In one of these embodiments the hooks are removable. In one of these embodiments the hooks are securely attached to the raised wall 104.

In one embodiment, as seen in FIG. 1, the pet restraint arm 500 can be attached to the raised wall 104. There pet restraint arm 500 may be removable attached or fixed to the table. If the pet restraint arm 500 is fixed to the table, it may be attached in a manner that will allow the arm to be folded down and locked in a horizontal position to the tabletop 103. This will allow for easier storage while keeping the arm pet restraint arm 500 attached to the table.

In an embodiment a rubberized coating can also be applied to the tabletop 103 to prevent a pet from slipping while standing on the tabletop 103. This coating can be a flat rubber that increases the friction coefficient. In a second embodiment this can be a rough coating that allows the pets foot to more readily grip the surface. In yet a third embodiment a combination may be used.

Figure 2:
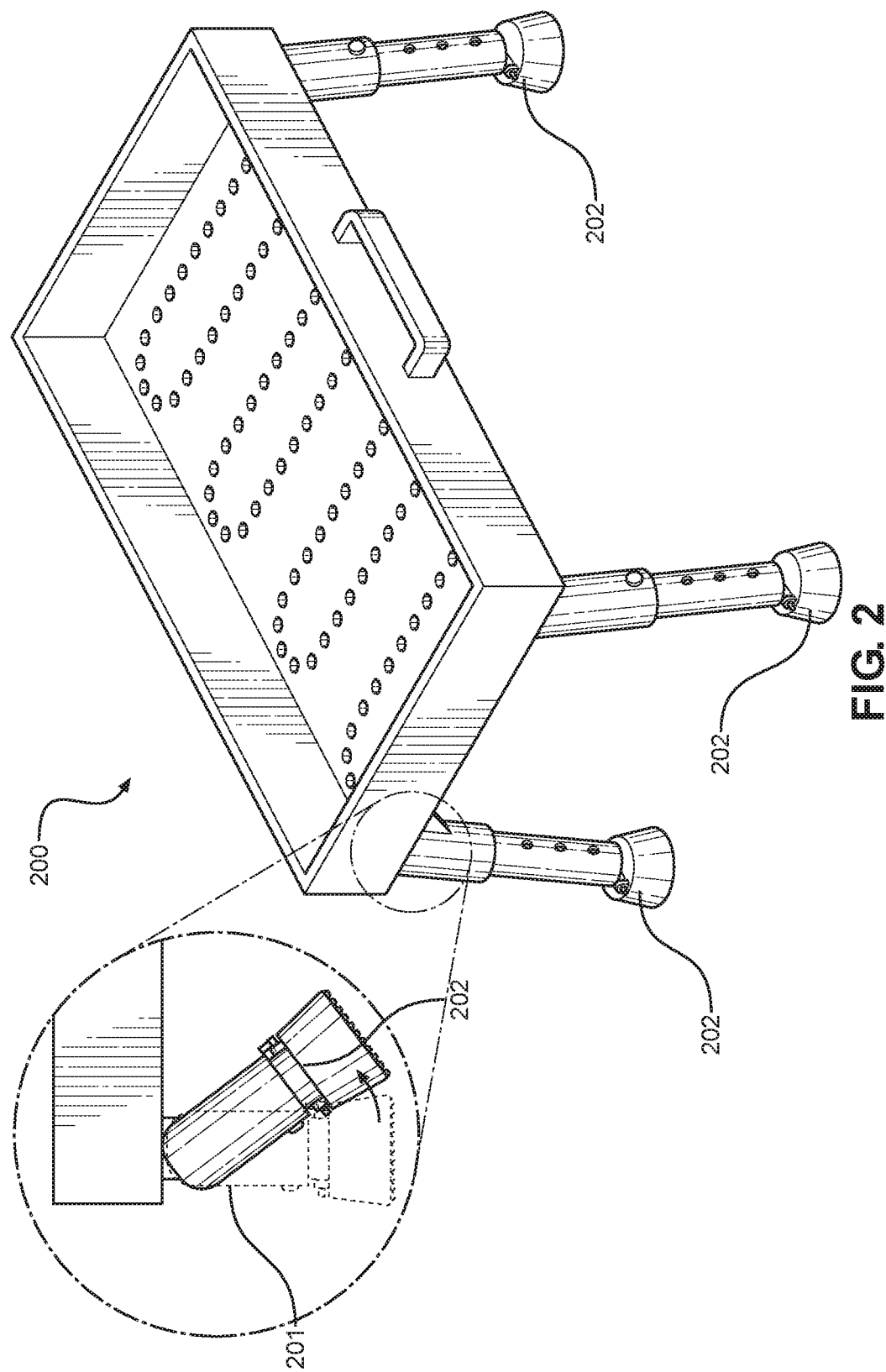
FIG. 2 a prospective view of an embodiment of legs of the table attached with a hinge to the bottom of the table.

Referring now to FIG. 2, there is shown an embodiment where the leg 200 is attached to the pet washing table 100 using a hinge connector 201. It should be understood by one skilled in the art that any manner of attaching a leg to a table will be included as part of this disclosure including but not limited to a fixed leg, a swivel joint, or a pin. The legs should be able to be locked out in a set position such that the table is fully supported. The table may be able to support weight in excess of up to 200 pounds. Depending on the size of the table and the legs the table could support anywhere from 5 to 200 pounds, this will ensure that any breed of pet can be washed on the table.

The embodiment of FIG. 2 shows a high friction footpad 202 to reduce movement of the table once set up and positioned. A high friction footpad can be made up of but is not limited to, rubber, felt or plastic. In some embodiments the footpad can be wider than the leg. In some embodiments the footpad can be 2-5 inches bigger than the legs. This will help to increase the amount of force required before the table slips. This increase in size will also prevent the table from sinking into the ground in the event of outdoor bathing. One of ordinary skill in the art will understand that this disclosure is not limiting in anyway the manner in which the footpad is attached to the leg. In an embodiment the leg does not have to be circular, various shapes are envisioned. In the present embodiment an oval shape is disclosed, this shape will add to the tables ability to support larger breeds of pets.

Figure 3:
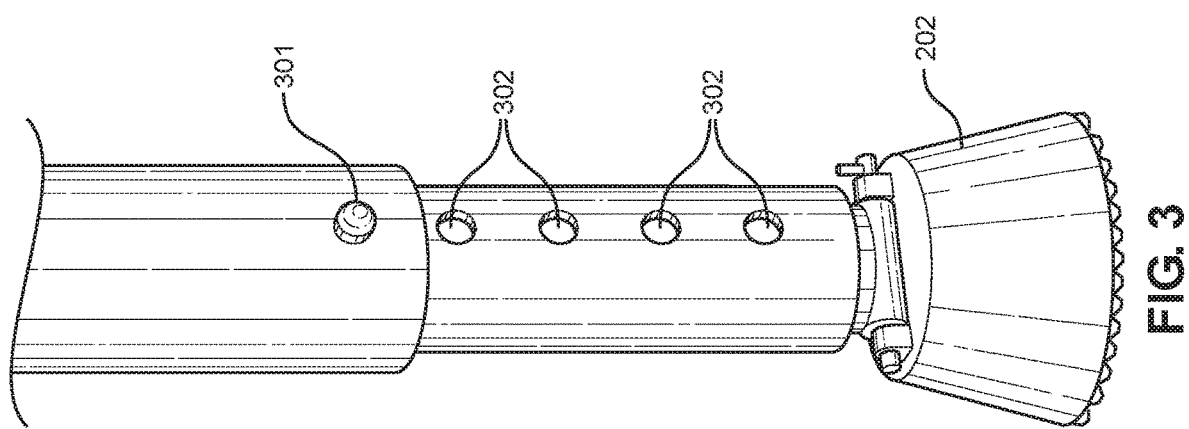
FIG. 3 shows an enlarged prospective view of embodiment of the restraint arm.

Referring now to FIG. 3, there is shown a view of a leg where the embodiment includes a pushpin 301 and hole 302 telescopic adjustment system. The adjustment system of this disclosure is not limited to a push pin and hole system. Any form of leg adjustment will be plausible for this disclosure including but not limited to, a screw tightening system, a pin and cotter pin system, a lever tightening system, or any other system that allows for the adjustment of legs. By using a lever or a screw tightening system the legs will be able to be adjusted to any height and not only those of the preset holes.

Further, the leg may be attached by a swivel joint. This can be a pin swivel or a ball and socket joint or any other type of connection that allows for the footpad to move. This will allow the footpad to automatically level itself when the table is set up.

Figure 4:
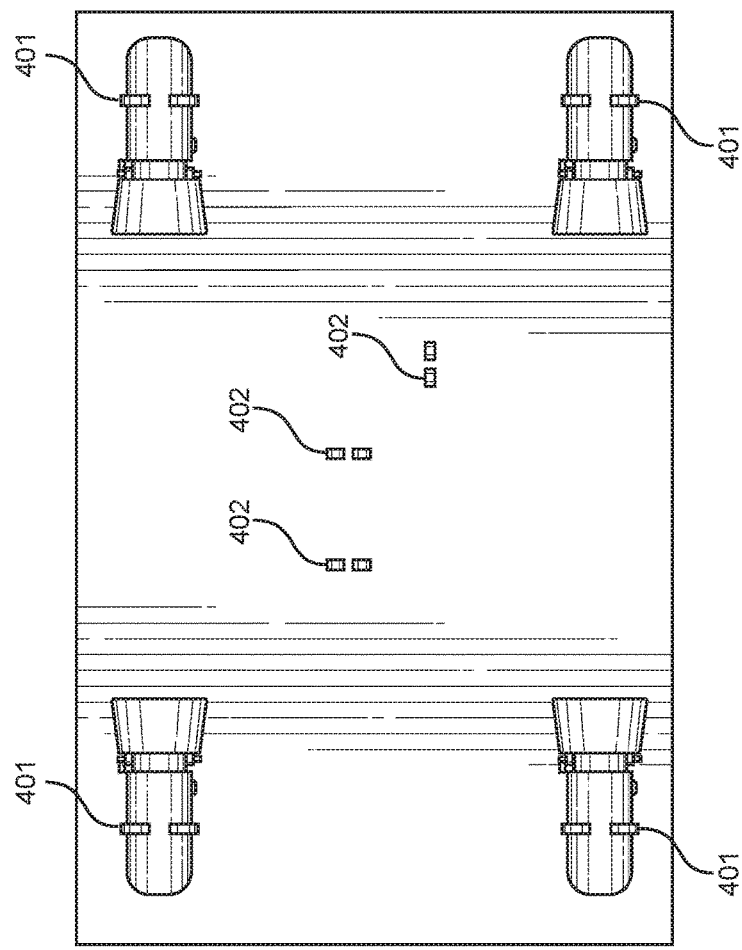
FIG. 4 shows an enlarged prospective view of embodiment of the pet restraint.

Referring now to FIG. 4, there is shown a bottom view of the table with the legs folded under and locked parallel to the tabletop 103. This folding of the legs allows for easier storage and movement of the table. In one embodiment the table can have clips or fasteners 401 to hold the legs to the table. This will ensure that the legs stay folded during storage or transport. Further, in the embodiments where the pet restraint arm 500 is removable there can be clips 402 placed under the table for storage of the arm. This will ensure that the arm stays with the table during transport and storage.

Figure 5:
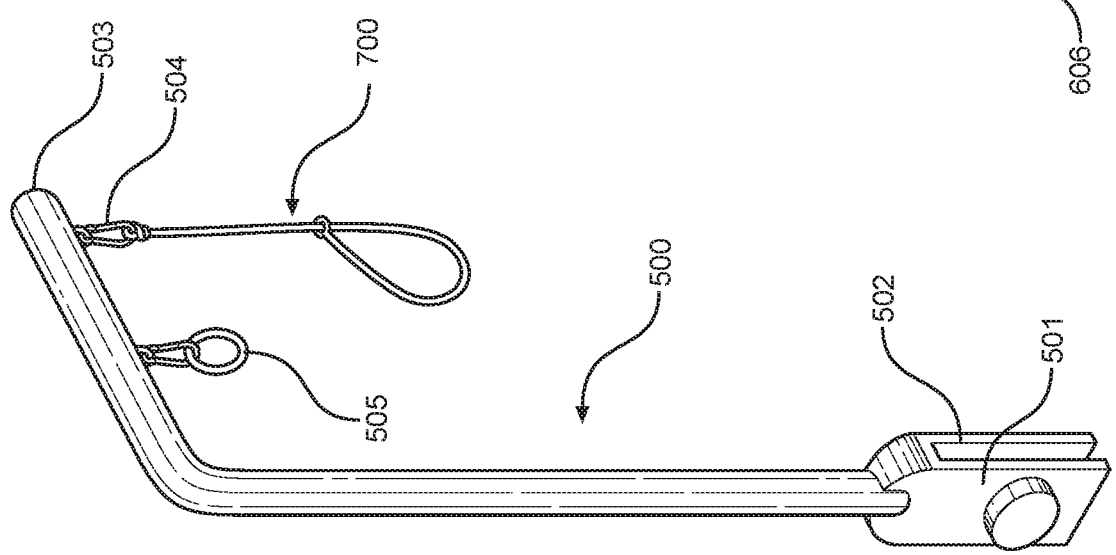
FIG. 5 shows an enlarged prospective view of an embodiment of a leg with one embodiment of the extension mechanism.

Referring now to FIG. 5, there is shown an embodiment of the pet restraint arm 500 is shown. The restraint arm may have a connector 502 at one end to allow the restraint arm 500 to be removably attached to the raised wall 104 in FIG. 1. In this embodiment a screw with a turn knob 501 is used to hold the arm in place using pressure, however, it should be understood that any manner of either permanently or removably attaching the arm to the table is also contemplated as part of this disclosure. Further, the embodiment of FIG. 1 shows the arm connected to the raised wall, however, it is also contemplated that the restraint arm can be connected to a leg, or the tabletop, or any other place of the pet washing table. In this embodiment the pet restraint arm 500 is in a "L" shape, however other shapes are contemplated as part of this disclosure, including but not limited to a semi-circle, a straight bar, or a "C" shape. In the present embodiment the pet restraint arm 500 has a second pet restrain connector 505 attached at a point behind the first pet restraint connector. It is contemplated by this disclosure that many different configurations of a first and second pet restrain connector are possible and embody the present invention.

In an embodiment of the pet restraint arm 500 is shown. a pet restraint to the end of the restraint arm 503 and various connectors can be used. In the present embodiment a carabiner type connector 504 is used to allow for different restraint type to be attached. In other embodiments the connector may be a ring or a knot such that the restraint is permanently affixed to the restraint arm. A second connector 505 may be attached to the restraint arm 500 to allow for additional restraints to be added. This connector may be a ring or a carabiner or any other type of connector.

Figure 6:
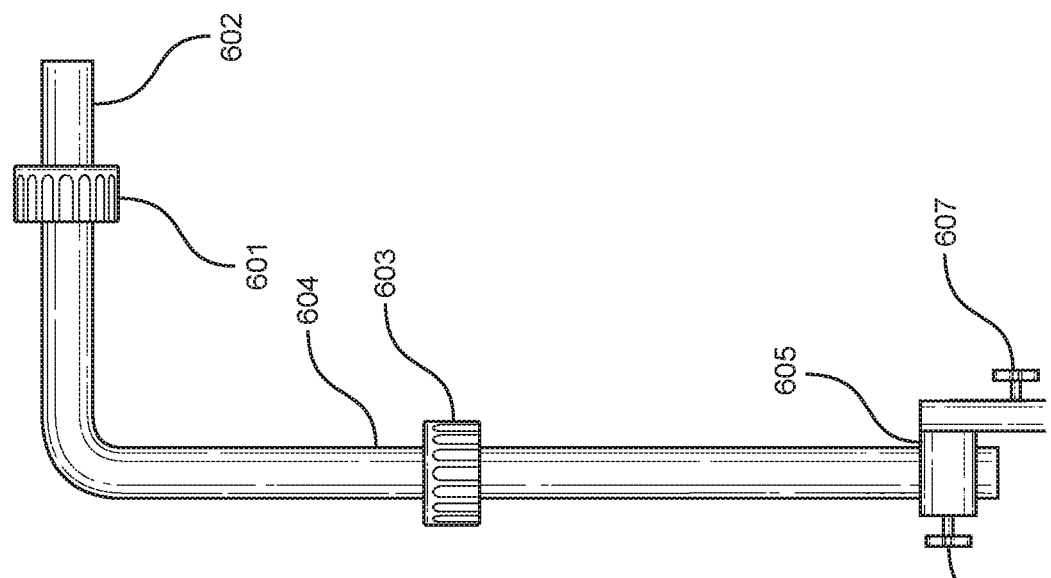
FIG. 6 shows a perspective view of an embodiment of the pet restraint arm that is adjustable.

Referring now to FIG. 6, there is shown there is an embodiment of the pet restraint arm shown that is fully adjustable. There can be seen a telescopic adjuster 601 placed along the top portion 602 of the restraint arm 500. This allows the arm to extend further out over the table 103. Further there can be a second telescopic adjuster 603 placed along the vertical portion 604 of the restraint arm 500. This will allow the arm to rise and lower to accommodate pets of varying heights. In an embodiment the arm can be attached to the table in a manner that will allow the arm to further be adjusted in a vertical manner via the connection. This connection 605 will allow the arm to move vertically therethrough or to be rotated then to be tightened in place using a turn knob 606. Turn knob 607 will allow the connector to be secured to the table. In other embodiments the connection can be permanently secured to the table and only allow the arm to be removed. It is important that the adjustable restraint arm 500 is constructed in such a manner that the stability of the arm remains intact.

Figure 7:
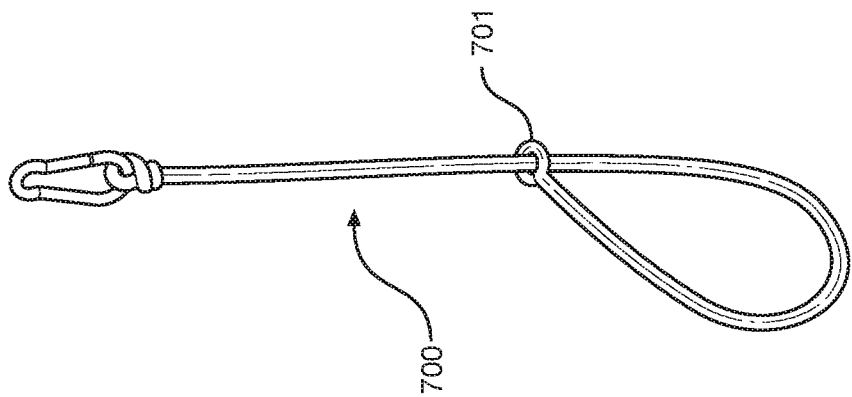
FIG. 7 shows a perspective view of an embodiment of the pet restraint.

Referring now to FIG. 7, there is shown an embodiment of the pet restraint 700 is shown. The pet restraint maybe a self-adjusting noose. This will allow the restraint to tighten around the pet in the event that the pet no longer wants a bath and tries to escape. It can be seen that there is a ring 701 that makes up the noose design. The ring will allow the pet restraint 700 to easily adjust and not remained tightened around the pet. In other embodiments a knot may be used in place of the ring 701. A knot will allow the restraint to remain in a consistently tightened position. This knot may either be a solid knot or a slip knot to allow for adjustments.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A portable pet washing table, comprising:
a tabletop having a plurality of drain holes configured to allow water and particulates to drain therethrough;
a raised wall disposed around a perimeter edge of the tabletop, whereby the tabletop is positioned below a top edge of the raised wall;
a plurality of legs attached to an underside of the tabletop, such that the legs are in a vertical position relative to the tabletop;
wherein, the plurality of legs attaches to the underside of the tabletop via a hinge, whereby the plurality of legs may fold to a position parallel with the tabletop;
a plurality of clip fasteners disposed on the underside of the tabletop, whereby the plurality of clip fasteners secures the plurality of legs to the underside of the tabletop when in the position parallel with the tabletop;
a high friction footpad attached to each of the plurality of legs;
wherein, the high friction footpad is attached to the opposite end of each leg than that which is attached to the underside of the tabletop;
a restraint arm attached to the raised wall via a connector, such that the restraint arm extends upwardly above the tabletop;
whereby the plurality of clip fasteners secures the restraint arm to the underside of the tabletop for storage; and
a restraint attached to the end of the restraint arm on the opposite end than that which is attached to the table, wherein the restraint is configured to secure an animal to the restraint arm.

2. The portable pet washing table of claim 1, wherein, the plurality of legs is independently adjustable such that the table can be positioned at different heights.

3. The portable pet washing table of claim 1, wherein, the restraint arm is removable.

4. The portable pet washing table of claim 1, wherein, the restraint arm is in an "L" shape.

5. The portable pet washing table of claim 1, wherein the connector comprises a screw with a turn knob, whereby the screw applies pressure to the raised wall to secure the restraint arm in place.

6. The portable pet washing table of claim 1, further comprising: a rubberized top coating applied to the tabletop.

7. The portable pet washing table of claim 1, further comprising: a carry handle attached to a side of the table to allow for carrying of the table.

8. A portable pet washing table, comprising:
a tabletop,
wherein, the tabletop further comprising a plurality of drain holes to allow for water to drain through the holes;
a raised wall disposed around a perimeter edge of the tabletop, whereby the tabletop is positioned below a top edge of the raised wall;
a rubberized top coating applied to the tabletop, while still maintaining the plurality of drain holes for draining;
at least four legs attached to an underside of the tabletop, such that the legs are in a vertical position relative to the tabletop;
wherein, the at least four legs are attached to the underside of the table via a hinge such that the legs can be folded into a position that is parallel to the tabletop;
a plurality of clip fasteners disposed on the underside of the tabletop, whereby the plurality of clip fasteners secures the plurality of legs to the underside of the tabletop when in the position parallel with the tabletop;
a high friction footpad attached to each of the at least four legs;
wherein, the footpad is attached to the opposite end of each leg than that which is attached to the underside of the tabletop;
an "L" shaped restraint arm attached to the wall such that the restraint arm raises above the tabletop;
a restraint attached to the end of the restraint arm on the opposite end than that which is attached to the table.

9. The portable pet washing table of claim 8, wherein, the at least four legs are independently adjustable such that the table can be positioned at different heights.

10. The portable pet washing table of claim 8, further comprising: a carry handle attached to a side of the table to allow for carrying of the table.

11. The portable pet washing table of claim 8, further comprising: a connector attached to the restraint arm to allow additional restraints to be connected to the restraint arm via the connector.

12. A method for setting up a portable pet washing station and preparing a pet for a bath, the method comprising;
placing the portable pet washing table in a location to allow for proper draining of the water from draining holes located in a tabletop section of the portable pet washing table;
removing an adjustable leg from a clip fastener disposed on the underside of the tabletop section;
folding the adjustable leg of the pet washing table from a horizontal position relative to the tabletop into a vertical position relative to the tabletop;
placing a pet on a rubberized tabletop surface;
removing a restraint arm from a clip fastener from the underside of the tabletop section; and
attaching a restraint located at the end of a restraint arm to the pet.

13. The method of claim 12, further comprising:
attaching the restraint arm to the pet washing table such that the pet restraint is located above the tabletop.

14. The method of claim 12, further comprising:
Attaching a second restraint to pet restraint arm wherein the second restraint is attached to the restraint arm via an additional restraint connector.

15. The method of claim 12, further comprising:
adjusting the height of the tabletop by adjusting the length of each adjustable leg of the portable pet washing table.

* * * * *